(12) United States Patent
Himmanen et al.

(10) Patent No.: US 8,208,437 B2
(45) Date of Patent: Jun. 26, 2012

(54) SYSTEM AND METHOD FOR IMPROVED SCHEDULING FOR TIME-FREQUENCY SLICING

(75) Inventors: Heidi Himmanen, Turku (FI); Harri J. Pekonen, Raisio (FI)

(73) Assignee: Nokia Corporation, Espoo (FI)

( * ) Notice: Subject to any disclaimer, the term of this patent is extended or adjusted under 35 U.S.C. 154(b) by 766 days.

(21) Appl. No.: 12/239,019

(22) Filed: Sep. 26, 2008

(65) Prior Publication Data

US 2009/0109918 A1    Apr. 30, 2009

Related U.S. Application Data

(60) Provisional application No. 60/976,220, filed on Sep. 28, 2007.

(51) Int. Cl.
*H04W 4/00* (2009.01)

(52) U.S. Cl. .... 370/330; 370/345; 370/348; 370/395.21

(58) Field of Classification Search .................. None
See application file for complete search history.

(56) References Cited

U.S. PATENT DOCUMENTS

| 5,907,491 A | * | 5/1999 | Canada et al. ................. 700/108 |
| 2007/0015460 A1 | * | 1/2007 | Karabinis et al. ............ 455/12.1 |

* cited by examiner

*Primary Examiner* — Chirag Shah
*Assistant Examiner* — Salvador E Rivas
(74) *Attorney, Agent, or Firm* — Banner & Witcoff, Ltd.

(57) ABSTRACT

A system and method for improved scheduling for time-frequency slicing. According to various embodiments, slot allocations are made so as to guarantee time for tuning between slots. When scheduling services for multiplexes covering multiple radio frequency (RF) channels, time is provided for the receiver to tune to another radio-frequency channel between at least two of the time frequency frames. This is accomplished by arranging slots so that a service carried in a slot within the tuning time before the end of a time frequency frame k is not transmitted in a slot within the tuning time after the beginning of the next time frequency frame k+1.

15 Claims, 8 Drawing Sheets

(Prior Art)

FIG. 1

| | RF1 | RF2 | RF3 | RF4 |
|---|---|---|---|---|
| 210 → | 36 | 27 | 18 | 9 |
| | 35 | 26 | 17 | 8 |
| | 34 | 25 | 16 | 7 |
| | 33 | 24 | 15 | 6 |
| | 32 | 23 | 14 | 5 |
| | 31 | 22 | 13 | 4 |
| | 30 | 21 | 12 | 3 |
| | 29 | 20 | 11 | 2 |
| 220 → | 28 | 19 | 10 | 1 |
| 210 → | 27 | 18 | 9 | 36 |
| | 26 | 17 | 8 | 35 |
| | 25 | 16 | 7 | 34 |
| | 24 | 15 | 6 | 33 |
| | 23 | 14 | 5 | 32 |
| | 22 | 13 | 4 | 31 |
| | 21 | 12 | 3 | 30 |
| | 20 | 11 | 2 | 29 |
| 220 → | 19 | 10 | 1 | 28 |
| 210 → | 18 | 9 | 36 | 27 |
| | 17 | 8 | 35 | 26 |
| | 16 | 7 | 34 | 25 |
| | 15 | 6 | 33 | 24 |
| | 14 | 5 | 32 | 23 |
| | 13 | 4 | 31 | 22 |
| | 12 | 3 | 30 | 21 |
| | 11 | 2 | 29 | 20 |
| 220 → | 10 | 1 | 28 | 19 |
| 210 → | 9 | 36 | 27 | 18 |
| | 8 | 35 | 26 | 17 |
| | 7 | 34 | 25 | 16 |
| | 6 | 33 | 24 | 15 |
| | 5 | 32 | 23 | 14 |
| | 4 | 31 | 22 | 13 |
| | 3 | 30 | 21 | 12 |
| | 2 | 29 | 20 | 11 |
| 220 → | 1 | 28 | 19 | 10 |

$T_{tuning}$

SHIFT

FIG. 2

|   | | RF1 | RF2 | RF3 | RF4 | RF5 | RF6 |
|---|---|---|---|---|---|---|---|
| $T_{tuning}$ | 210 | 30 | 180 | 150 | 120 | 90 | 60 |
| | | 29 | 179 | 149 | 119 | 89 | 59 |
| | | 28 | 178 | 148 | 118 | 88 | 58 |
| | | 27 | 177 | 147 | 117 | 87 | 57 |
| | | 26 | 176 | 146 | 116 | 86 | 56 |
| SHIFT 300 | | 25 | 175 | 145 | 115 | 85 | 55 |
| | | 24 | 174 | 144 | 114 | 84 | 54 |
| | | 23 | 173 | 143 | 113 | 83 | 53 |
| | | 22 | 172 | 142 | 112 | 82 | 52 |
| | | 21 | 171 | 141 | 111 | 81 | 51 |
| | | 20 | 170 | 140 | 110 | 80 | 50 |
| | | 19 | 169 | 139 | 109 | 79 | 49 |
| | | 18 | 168 | 138 | 108 | 78 | 48 |
| | | 17 | 167 | 137 | 107 | 77 | 47 |
| | | 16 | 166 | 136 | 106 | 76 | 46 |
| | | 15 | 165 | 135 | 105 | 75 | 45 |
| | | 14 | 164 | 134 | 104 | 74 | 44 |
| | | 13 | 163 | 133 | 103 | 73 | 43 |
| | | 12 | 162 | 132 | 102 | 72 | 42 |
| | | 11 | 161 | 131 | 101 | 71 | 41 |
| | | 10 | 160 | 130 | 100 | 70 | 40 |
| | | 9 | 159 | 129 | 99 | 69 | 39 |
| | | 8 | 158 | 128 | 98 | 68 | 38 |
| | | 7 | 157 | 127 | 97 | 67 | 37 |
| | | 6 | 156 | 126 | 96 | 66 | 36 |
| | 220 | 5 | 155 | 125 | 95 | 65 | 35 |
| | | 4 | 154 | 124 | 94 | 64 | 34 |
| | | 3 | 153 | 123 | 93 | 63 | 33 |
| | | 2 | 152 | 122 | 92 | 62 | 32 |
| | | 1 | 151 | 121 | 91 | 61 | 31 |
| | | P1 & P2 | | | | | |

FIG. 3

| | RF1 | RF2 | RF3 | RF4 | RF5 | RF6 | |
|---|---|---|---|---|---|---|---|
| | \multicolumn{6}{c}{P1 & P2} | |
| 210 | 42 41 40 39 | 35 34 33 32 | 28 27 26 25 | 21 20 19 18 | 14 13 12 11 | 7 6 5 4 | $T_{GP}$ |
| 220 | 38 37 36 | 31 30 29 | 24 23 22 | 17 16 15 | 10 9 8 | 3 2 1 | |
| 210 | 35 34 33 32 | 28 27 26 25 | 21 20 19 18 | 14 13 12 11 | 7 6 5 4 | 42 41 40 39 | |
| 220 | 31 30 29 | 24 23 22 | 17 16 15 | 10 9 8 | 3 2 1 | 38 37 36 | |
| 210 | 28 27 26 25 | 21 20 19 18 | 14 13 12 11 | 7 6 5 4 | 42 41 40 39 | 35 34 33 32 | |
| 220 | 24 23 22 | 17 16 15 | 10 9 8 | 3 2 1 | 38 37 36 | 31 30 29 | |
| 210 | 21 20 19 18 | 14 13 12 11 | 7 6 5 4 | 42 41 40 39 | 35 34 33 32 | 28 27 26 25 | |
| 220 | 17 16 15 | 10 9 8 | 3 2 1 | 38 37 36 | 31 30 29 | 24 23 22 | |
| 210 | 14 13 12 11 | 7 6 5 4 | 42 41 40 39 | 35 34 33 32 | 28 27 26 25 | 21 20 19 18 | |
| 220 | 10 9 8 | 3 2 1 | 38 37 36 | 31 30 29 | 24 23 22 | 17 16 15 | |
| 210 SHIFT | 7 6 5 4 | 42 41 40 39 | 35 34 33 32 | 28 27 26 25 | 21 20 19 18 | 14 13 12 11 | |
| 220 | 3 2 1 | 38 37 36 | 31 30 29 | 24 23 22 | 17 16 15 | 10 9 8 | $T_{tuning}$ |

| SHIFT | 8<br>7<br>6<br>5<br>4 | 1<br>42<br>41<br>40<br>39 | 36<br>35<br>34<br>33<br>32 | 29<br>28<br>27<br>26<br>25 | 22<br>21<br>20<br>19<br>18 | 15<br>14<br>13<br>12<br>11 | |
|---|---|---|---|---|---|---|---|
| 220 — | 3<br>2<br>1 | 38<br>37<br>36 | 31<br>30<br>29 | 24<br>23<br>22 | 17<br>16<br>15 | 10<br>9<br>8 | $T_{tuning}$ |
| | P1 & P2 ||||||| 
| 210 — | 42<br>41 | 35<br>34 | 28<br>27 | 21<br>20 | 14<br>13 | 7<br>6 | $T_{GP}$ |
| | 40<br>39<br>38<br>37<br>36<br>35 | 33<br>32<br>31<br>30<br>29<br>28 | 26<br>25<br>24<br>23<br>22<br>21 | 19<br>18<br>17<br>16<br>15<br>14 | 12<br>11<br>10<br>9<br>8<br>7 | 5<br>4<br>3<br>2<br>1<br>42 | |

FIG. 5

SYSTEM AND METHOD FOR IMPROVED SCHEDULING FOR TIME-FREQUENCY SLICING

CROSS-REFERENCE TO RELATED PATENT APPLICATIONS

This application claims priority from Provisional Application U.S. Application 60/976,220, filed Sep. 28, 2007, incorporated herein by reference in its entirety.

FIELD OF THE INVENTION

The present invention relates generally to the transferring of data in a transmission system. More particularly, the present invention relates to the scheduling of services for multiplexes covering several Radio Frequency (RF) channels.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Digital broadband broadcast networks enable end users to receive digital content including video, audio, data, etc. Using a mobile, portable or fixed terminal, a user may receive digital content over a wireless digital broadcast network.

The capacity of a wireless transmission channel, in a broadcasting system, for example, can be divided between different services by using time-division multiplexing (TDM). Each service is allocated a portion of a TDM frame. FIG. 1 illustrates time-frequency (TF) slicing in which each TF frame is divided into four portions, one for each RF channel 120 (identified as RF1, RF2, RF3, and RF4). That is, the capacity of a fixed TDM frame can be dynamically divided between physical channels for data transmission. In TF slicing, a physical channel is a physical layer pipe (PLP). A PLP is a physical channel with a predefined modulation and error correction code rate. Generally in TF-slicing, one slot carries exactly one PLP. One PLP may carry one or several service components. It should be noted that the terms "PLP" and "service" are used in parallel herein. There must be a time shift between the slots of a certain physical channel in different RF channels. This makes it possible to use receivers with one tuner, because the receiver then has time to tune to the new frequency before receiving the next slot. The number of RF channels can be $N_{RF}=2, 3, 4, 5, 6$ or more in various embodiments. It should be noted that the RF channels used do not need to be adjacent to each other Using such time-frequency (TF) slicing, bit rate variations are averaged over all of the services being provided, thereby resulting in a decreased overall bit rate variation and a lower amount of wasted capacity. With TF slicing according to conventional systems and methods, several RF channels are used to increase the size of the TDM frame at issue and to multiplex services over all of the channels. The number of services being provided is increased proportionally relative to the number of RF channels, resulting in an increased statistical multiplexing gain. This arrangement also provides frequency diversity by extending the channel coding and interleaving over all of the available RF channels.

A problem arises when guaranteeing time for tuning to another RF channel between two TF frames in TF slicing is desired in conjunction with a requirement that reception with a single hopping-tuner should be enabled. The problem of slot allocation in the TF scheduler, while requiring a tuning time between TF frames and slots, is discussed below with regard to a previously proposed scheduling concept for TF-slicing. All services slot sizes of $X_i/N_{RF}$ are allocated on each RF frequency in the TF frame. $X_i$ can refer to the amount of orthogonal frequency division multiplexing (OFDM) cells required to carry the data of service i in the current TF frame, and $N_{RF}$ can refer to the number of RF frequencies.

Slots can be shifted, where the shift is the time frequency frame length ($T_F$) divided by the number ($N_{RF}$) of allocated RF channels, or:

$$\text{shift} = \frac{T_F}{N_{RF}}$$

In other words, the slots are shifted in relation to each other and the upper limit for $X_i/N_{RF}$ is max_slot_length=shift−$T_{tuning}$. $T_F$, the length of the TF frame, may be expressed in OFDM symbols, and $T_{tuning}$ is the time it takes for the receiver to change to another RF channel that may also be expressed in OFDM symbols. $T_F$, shift, $T_{tuning}$ and max_slot_length may also be expressed in units of time, e.g., in milliseconds. A slot can be divided on one RF as illustrated with respect to RF3 and RF4 in first TF frame 110 and second TF frame 100 in FIG. 1, where $N_{RF}=4$.

However, this type of scheduling is not sufficient to guarantee reception with one tuner in situations where no constraints are set for the service bit rates. For example, the scheduling may lead to slot allocations where sufficient tuning time before or after reception of pilot symbol signaling does not exist. An example of this scenario is depicted in FIG. 1, where there is not enough time for tuning when receiving the last slot of first TF frame 110 (symbols 3-5 on RF4), receiving P1 and P2 on any RF channel, and receiving the first slot of second TF frame 100 (symbols 11 and 12 on RF3). It should be noted in relation to FIG. 1 that pilot symbols P1 and P2, which precede every TF frame, are described in U.S. patent application Ser. No. 11/686,636, entitled "DVB-H2 SERVICE DISCOVERY FREQUENCY DOMAIN CORRELATION" to Auranen et al.

It should be noted that the conventional rules for slot allocation for one tuner reception can be summarized as follows. If the last slot of a service of the current TF frame and the first slot of the same service of the next TF frame are on different RF channels, and there is not enough time for tuning before the P1 and P2 signaling, time for tuning shall be reserved after the P1&P2 signaling. As a result of the above, if a slot is divided on one RF in the current TF frame, a slot carrying the same service cannot be divided on another RF in the next TF frame. If the allocation is illegal, the scheduler would, for example, have to perform some manner of switching of service slots. Because almost every service allocation in conventional TF frame sets some restrictions on allocations in the next TF frame, the slot allocation scheduling becomes a very complex process, where the transmitter needs to perform receiver tests for all services and groups of services or PLPs (Physical Layer Pipes).

In the context of the Digital Video Broadcast (DVB)-T2 standard (the next-generation terrestrial digital television standard), no solution to the above issues has been provided thus far.

SUMMARY

Various embodiments provide an improved system and method for improved scheduling for time-frequency slicing. According to various embodiments, slot allocations are made so as to guarantee time for tuning between slots. In these various embodiments, when scheduling services for multiplexes covering multiple RF channels, time is provided for the receiver to tune to another radio-frequency channel between at least two of the time frequency frames. This is accomplished by arranging slots so that a service carried in a slot within the tuning time before the end of a time frequency frame k is not transmitted in a slot within the tuning time after the beginning of the next time frequency frame k+1. This arrangement is relatively simple to implement and also allows the implementation of TF-slicing without using a guard period.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 1 is a representation showing an illegal slot allocation of a service between two TF frames;

FIG. 2 is a representation of a single TF frame highlighting first and second portions of the frame, where services allocated to the first portion are not permitted to be allocated slots in the second portion in the next frame;

FIG. 3 is a representation of a part of another single TF frame, showing the first shift of a frame with frame length of $T_F$=180 OFDM symbols per RF channel;

FIG. 4 is a representation of a still another TF frame, where the highlighted first and second portions possess different sizes;

FIG. 5 is a representation of a frame arrangement where the last slot in the current frame and the first slot in the next frame carrying the same service are not permitted to be carried on the same RF frequency;

DETAILED DESCRIPTION OF VARIOUS EMBODIMENTS

Figure 6:
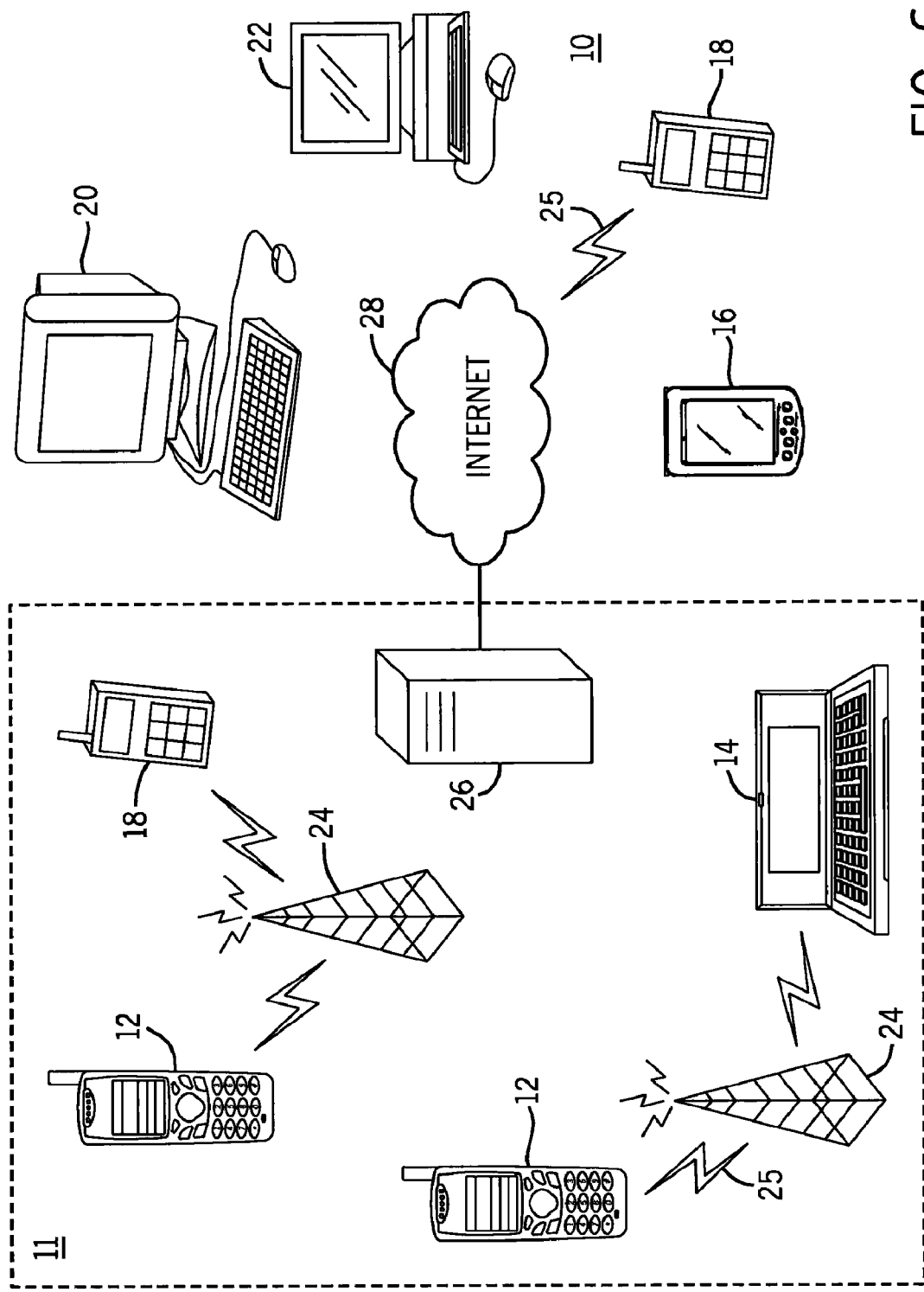
FIG. 6 is an overview diagram of a system within which various embodiments of the present invention may be implemented.

Various embodiments provide an improved system and method for improved scheduling for time-frequency slicing. According to various embodiments, slot allocations are made so as to guarantee time for tuning between slots. In these various embodiments, when scheduling services for multiplexes covering multiple RF channels, time is provided for the receiver to tune to another radio-frequency channel between at least two of the time frequency frames. This is accomplished by arranging slots so that a service carried in a slot within the tuning time before the end of a time frequency frame k is not transmitted in a slot within the tuning time after the beginning of the next time frequency frame k+1. This arrangement is relatively simple to implement and also allows the implementation of TF-slicing without using a guard period.

Figure 1:
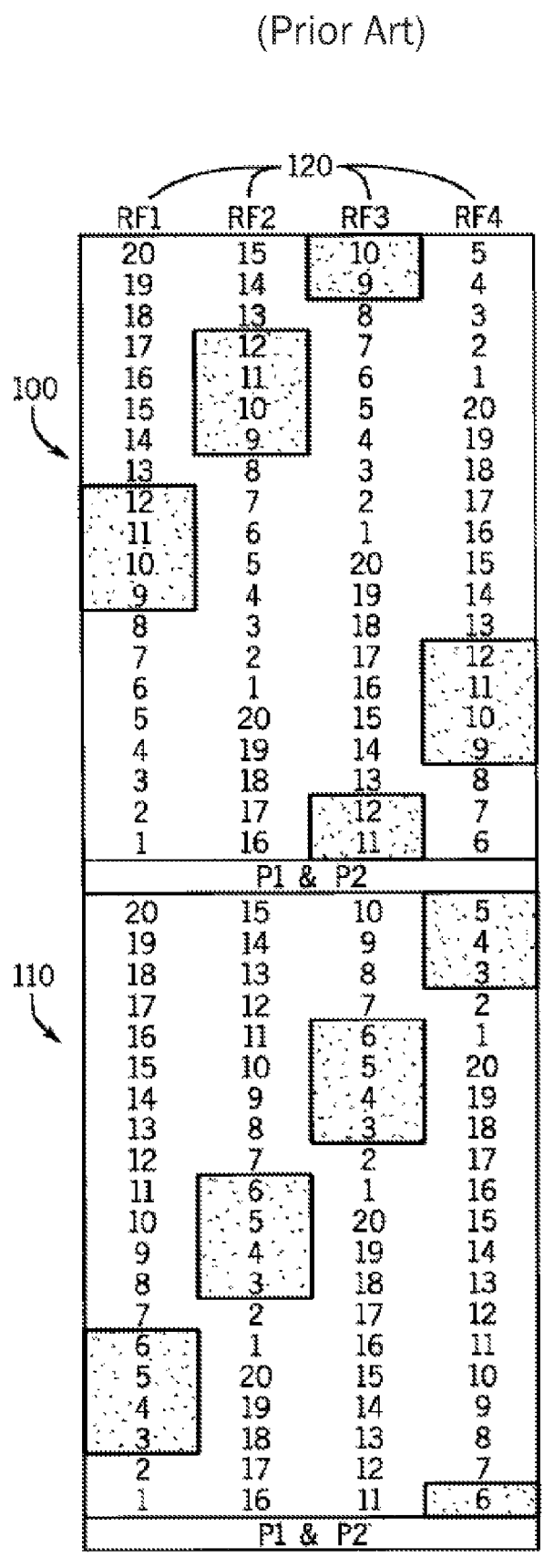

As discussed previously, the tuning issue which the various embodiments address most often occurs at the edges of frames, as is depicted in FIG. 1. The various embodiments serve to ensure that a service transmitted in the last slots (within the tuning time before the P1 and P2 symbols) of a frame will never be transmitted in the first slots (within the tuning time after the P1 and P2 symbols) in the next frame.

FIG. 2 is a representation of a single TF frame 200 highlighting relevant portions of the frame for the implementation of various embodiments. In the frame 200 of FIG. 2, the tuning time ($T_{tuning}$) comprises one slot, while the shift comprises nine slots. For the frame 200, a first portion 210 of slots and a second portion 220 of slots are identified on each RF channel. The first portion 210 represents slots or symbols that occur within the tuning time before the end of the frame. As can be observed in FIG. 2, the first portion 210 covers slots 9, 18, 27 and 36 in each RF channel. The second portion 220 represents symbols or slots that occur within the tuning time after the beginning of the frame. In FIG. 2, the second portion 220 covers slots 1, 10, 19 and 28 in each RF channel. Although in FIG. 2 the first and second portions 210 and 220 are of the same size (i.e., covering one slot), these size can differ from each other. This can occur because the tuning time before receiving pilot signals can be smaller than the tuning time in other parts of the frame. This is due to the face that the pilot signals (P1 and P2) can also be used for channel estimation.

According to various embodiments, the services that are allocated symbols in the first portion 210 cannot also be allocated slots in the second portion 220 in the next frame (not shown) in order to provide sufficient time for the receiver to tune to the new RF channel. In the situation depicted in FIG. 2, this means that a service carried in slot 9 of the frame 200 can be carried in any slot of the next frame except for slots 1, 10, 19 and 28. In other words, the service carried in slot 9 can be carried in any of slots 2-9, 11-18, 20-27 and 29-36 in the next frame. In various embodiments, there are no other limitations for any of the services that are carried in the permissible slots. As is noted below, the allocations are tied to OFDM symbols, with the slots being tied to OFDM cells. An OFDM cell is a datum having a length of one OFDM symbol, which is on an OFDM subcarrier. Thus, if there are K carriers, then there are K OFDM cells. All of the K OFDM cells together form one OFDM symbol. A slot as referred to herein as a combination of (a number of) OFDM cells, meaning that the data of the service in an embodiment may be divided over several OFDM symbols.

FIG. 3 is a representation of another TF frame portion 300, showing the first shift of a frame with frame length $T_F$=180 OFDM symbols per RF channel. In FIG. 3, there are six RF channels, the shift comprises thirty OFDM symbols, and the tuning time is 5 OFDM symbols. This is shown to illustrate the frame portion 300 at the symbol level. As was the case in FIG. 2, the services that were allocated cells in symbols from the first portion 210 cannot be carried by any cells in symbols in the second portion in the next frame.

To prevent the same services from always being allocated to the first portion 210, the slot allocation for services in symbols 26-30 in the frame portion 300 in FIG. 3 could, for example, begin at symbol 6 or later. No restrictions are set on the location of other service slots, and a slot does not have to end at the shift. A service that is carried in any other portion but the first portion 210 in this frame could, for example, be carried in symbols 24-33.

The capacity of the first portion 210 of one frame (in OFDM symbols) is $T_{tuning}*N_{RF}^2$. As the duration of a particular first portion 210 is $T_{tuning}$, a first portion 210 appears $N_{RF}$ times on one RF channel, and there are $N_{RF}$ channels. It should be noted, however, that the tuning time is not always constant and may vary. In the next frame, the total capacity of the services that were carried in some of the symbols of the first portion 210 is capacity$\leq$max_slot_length$*N_{RF}^2=(T_F-N_{RF}*T_{tuning})*N_{RF}=($shift$-T_{tuning})*N_{RF}^2$ This means that the capacity of the services will be limited by only a very small extent. The maximum capacity of one service is still the same, as the maximum slot length (the part transmitted on one RF in one frame) is $$\text{max\_slot\_length} = \text{shift} - T_{tuning}, \text{ where}$$
$$\text{shift} = \frac{T_F}{N_{RF}}.$$

FIG. 4 is a representation of still another TF frame 400 with six different radio frequency channels. Each numbered cell represents an OFDM symbol in the TF frame 400. During each frame, 42 OFDM symbols carrying TF-sliced services are transmitted on each RF frequency. FIG. 4 demonstrates the situation where the first and second portions 210 and 220 may be of different sizes. In this case, the first portion 210 comprises 2 OFDM symbols, while the second portion 220 comprises three OFDM symbols. As in the other arrangements, the arrangement depicted in FIG. 4 serves to ensure that this is sufficient tuning time between all slots carrying the service(s) at issue, and the pilot symbols P1 and P2 can always be received.

In another embodiment, an additional requirement to the frame structure can be used in order to increase frequency diversity. In this particular embodiment, the last slot in the current frame and the first slot in the next frame carrying the same service is not permitted to be carried on the same RF frequency. An example of this rule in practice is depicted in FIG. 5. In FIG. 5, it is assumed that the TF frame structure is the same as the structure in FIG. 4. In this case, it is helpful to consider a situation where a particular service of note is carried in symbol number 7 which is part of the first portion 210 and is carried in the 6$^{th}$ RF channel (RF6) at the end of the first portion 210. According to the various embodiments discussed previously, the same service cannot be carried in the second portion 220 in the next frame. Additionally, and in order to increase frequency diversity, the first slot in the next frame for the service is not carried on the 6$^{th}$ RF channel. As a result, the service should be carried on any of the four symbols after the tuning time on any of the 1$^{st}$-5$^{th}$ RF channels. This is useful, for example, when using a convolutional interleaver that performs interleaving over one service.

FIG. 6 shows a system 10 including a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like. The exemplary communication devices of the system 10 may include, but are not limited to, a mobile device 12, a combination PDA and mobile telephone 14, a PDA 16, an integrated messaging device (IMD) 18, a desktop computer 21, and a notebook computer 22. Such devices can be utilize OBEX to exchange binary data as described above. The communication devices may be stationary or mobile as when carried by an individual who is moving. The communication devices may also be located in a mode of transportation including, but not limited to, an automobile, a truck, a taxi, a bus, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 7:
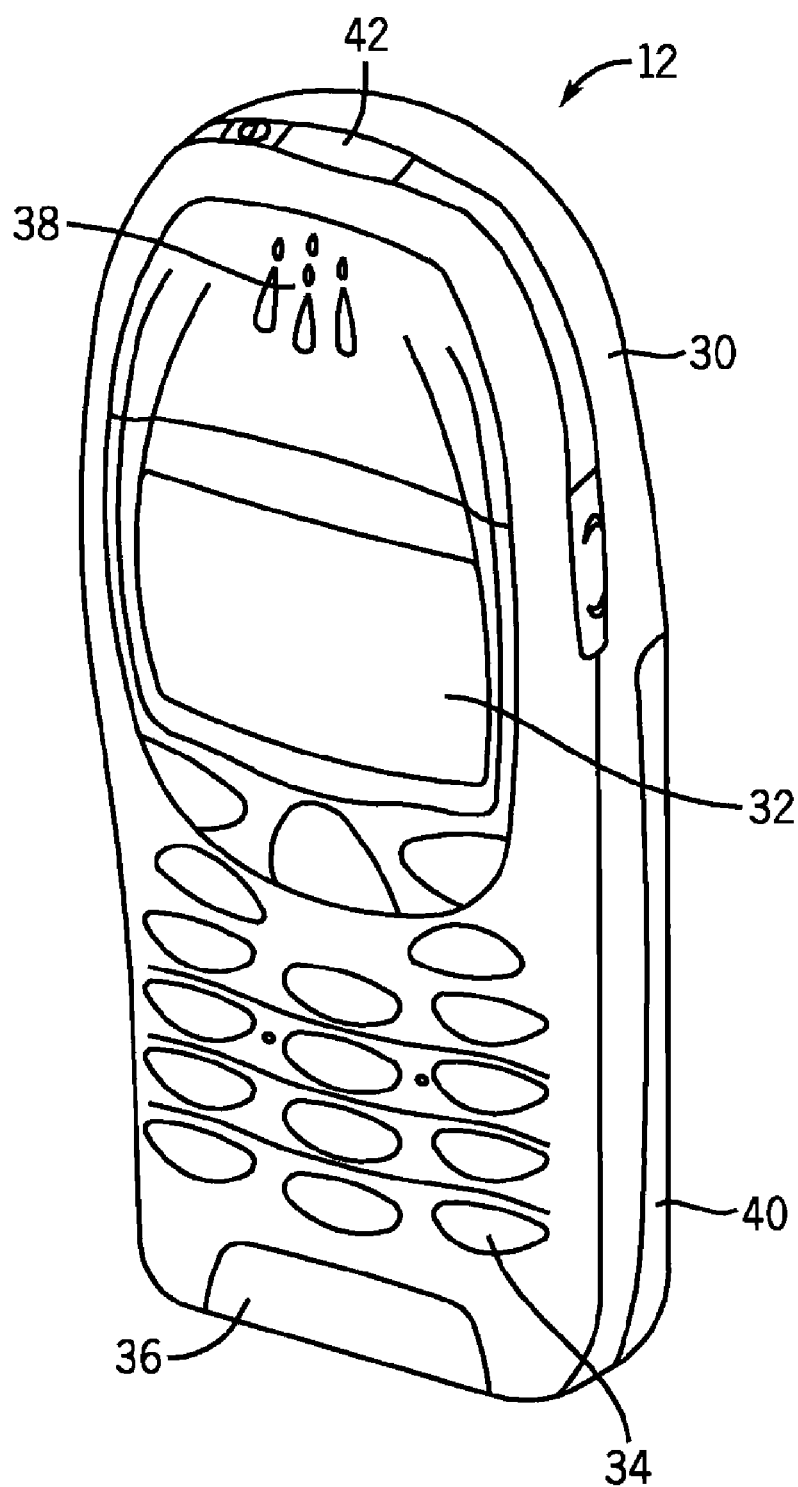
FIG. 7 is a perspective view of an electronic device that can be used in conjunction with the implementation of various embodiments of the present invention.
Figure 8:
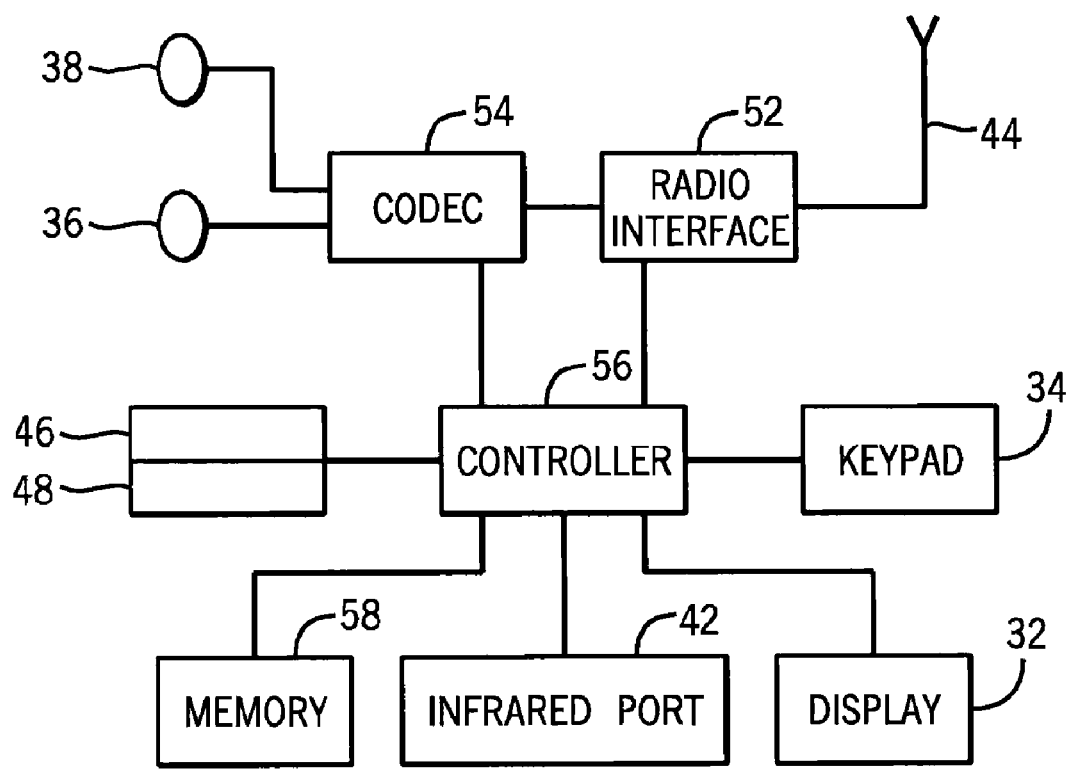
FIG. 8 is a schematic representation of the circuitry which may be included in the electronic device of FIG. 7.

FIGS. 7 and 8 show one representative mobile device 12 within which various embodiments may be implemented. It should be understood, however, that the present invention is not intended to be limited to one particular type of electronic device. The mobile device 12 of FIGS. 7 and 8 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

The various embodiments described herein is described in the general context of method steps or processes, which may be implemented in one embodiment by a computer program product, embodied in a computer-readable medium, including computer-executable instructions, such as program code, executed by computers in networked environments. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Software and web implementations of various embodiments can be accomplished with standard programming techniques with rule-based logic and other logic to accomplish various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method, comprising:
dividing a plurality of time frequency frames into a plurality of slots, each of the plurality of time frequency frames having at least one radio-frequency channel; and
providing time for tuning to another radio-frequency channel between time frequency frames by arranging the plurality of slots so that a service carried in a particular slot within a first tuning time at a first radio-frequency before the end of a time frequency frame k is not transmitted in another slot within a second tuning time after the beginning of a next time frequency frame k+1.

2. The method of claim 1, wherein the first tuning time and the second tuning time possess identical durations.

3. The method of claim 1, wherein the first tuning time and the second tuning time possess different durations.

4. The method of claim 1, further comprising providing that, if the particular slot is the last slot in the time frequency frame k, then the first slot in the next time frequency frame k+1 shall not carry the service on the first radio-frequency.

5. The method of claim 1, wherein the method operates in a digital broadband broadcast environment.

6. A non-transitory computer-readable memory including computer program code configured to, with a processor, cause an apparatus to:
divide a plurality of time frequency frames into a plurality of slots, each of the plurality ot time frequency frames having at least one radio-frequency channel; and
provide time for tuning to another radio-frequency channel between time frequency frames by arranging the plurality of slots so that a service carried in a particular slot within a first tuning time at a first radio-frequency before the end of a time frequency frame k is not transmitted in another slot within a second tuning time after the beginning of a next time frequency frame k+1.

7. An apparatus, comprising:
a processor; and
a memory including computer program code, the memory and the computer program code configured to, with the processor, cause the apparatus to:
divide a plurality of time frequency frames into a plurality of slots, each of the plurality of time frequency frames having at least one radio-frequency channel; and
provide time for tuning to another radio-frequency channel between time frequency frames by arranging the plurality of slots so that a service carried in a particular slot within a first tuning time at a first radio-frequency before the end of a time frequency frame k is not transmitted in another slot within a second tuning time after the beginning of a next time frequency frame k+1.

8. The apparatus of claim 7, wherein the first tuning time and the second tuning time possess identical durations.

9. The apparatus of claim 7, wherein the first tuning time and the second tuning time possess different durations.

10. The apparatus of claim 7, wherein the memory and computer program code are further configured to, with the processor, cause the apparatus to provide that, if the particular slot is the last slot in the time frequency frame k, then the first slot in the next time frequency frame k+1 shall not carry the service on the first radio-frequency.

11. The apparatus of claim 7, wherein the apparatus operates in a digital broadband broadcast environment.

12. The non-transitory computer-readable memory of claim 6, wherein the first tuning time and the second tuning time possess identical durations.

13. The non-transitory computer-readable memory of claim 6, wherein the first tuning time and the second tuning time possess different durations.

14. The non-transitory computer-readable memory of claim 6, wherein the memory and computer program code are further configured to, with the processor, cause the apparatus to provide that, if the particular slot is the last slot in the time frequency frame k, then the first slot in the next time frequency frame k+1 shall not carry the service on the first radio-frequency.

15. The apparatus of claim 7, wherein the apparatus operates in a digital broadband broadcast environment.

* * * * *

UNITED STATES PATENT AND TRADEMARK OFFICE
CERTIFICATE OF CORRECTION

| | |
|---|---|
| PATENT NO. | : 8,208,437 B2 |
| APPLICATION NO. | : 12/239019 |
| DATED | : June 26, 2012 |
| INVENTOR(S) | : Heidi Himmanen et al. |

It is certified that error appears in the above-identified patent and that said Letters Patent is hereby corrected as shown below:

Column 7, Claim 6, Line 37:
Please delete "plurality ot time" and insert -- plurality of time --

Signed and Sealed this
Fourth Day of December, 2012

David J. Kappos
*Director of the United States Patent and Trademark Office*